United States Patent [19]

Guerton et al.

[11] 4,271,949

[45] Jun. 9, 1981

[54] CLUTCH THRUST BEARING DEVICE

[75] Inventors: Jean P. Guerton, Maisons Alfort; Francis Regazzoni, Paris, both of France

[73] Assignee: S.K.F. Compagnie d'Applications Mechaniades, Clamart, France

[21] Appl. No.: 964,007

[22] Filed: Nov. 27, 1978

[30] Foreign Application Priority Data

Dec. 2, 1977 [FR] France .............................. 77 36374
Jun. 30, 1978 [FR] France .............................. 78 19736

[51] Int. Cl.³ .......................................... F16D 19/00
[52] U.S. Cl. ................................................. 192/98
[58] Field of Search ................... 192/98, 99 A, 99 R, 192/110 B; 308/184 A, 233, 236

[56] References Cited

U.S. PATENT DOCUMENTS

| 2,145,538 | 1/1939 | Binder | 192/110 B |
| 2,250,394 | 7/1941 | Reed | 192/99 R |
| 3,913,714 | 10/1975 | Camp | 192/98 X |

FOREIGN PATENT DOCUMENTS

| 1245229 | 7/1967 | Fed. Rep. of Germany | 192/98 |
| 2820205 | 11/1978 | Fed. Rep. of Germany | 192/98 |
| 587299 | 4/1947 | United Kingdom | 192/110 B |

Primary Examiner—Philip C. Kannan
Attorney, Agent, or Firm—Beveridge, DeGrandi, Kline and Lunsford

[57] ABSTRACT

A clutch thrust bearing assembly includes a roller bearing, a clutch release fork for moving the roller bearing axially and a spring. The spring is connected to the inner race of the roller bearing and has opposite portions which bear against the two branches of the clutch release fork to center the fork relative to the bearing.

12 Claims, 9 Drawing Figures

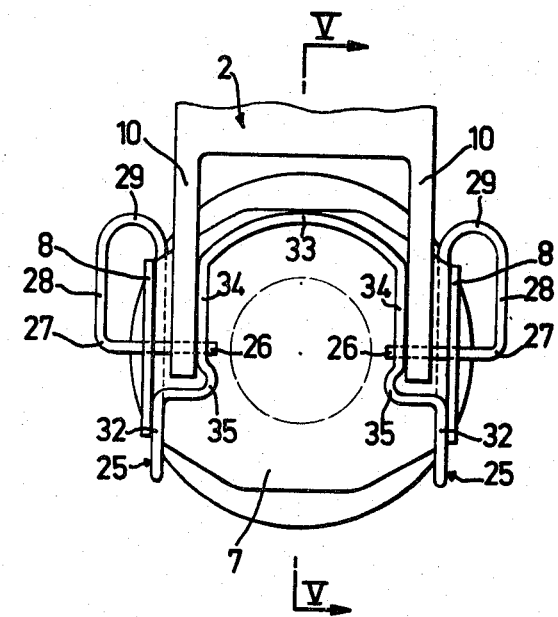
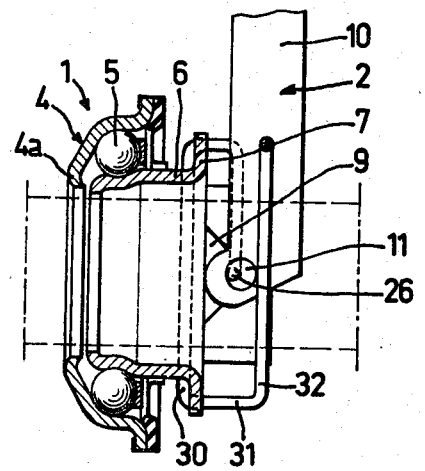

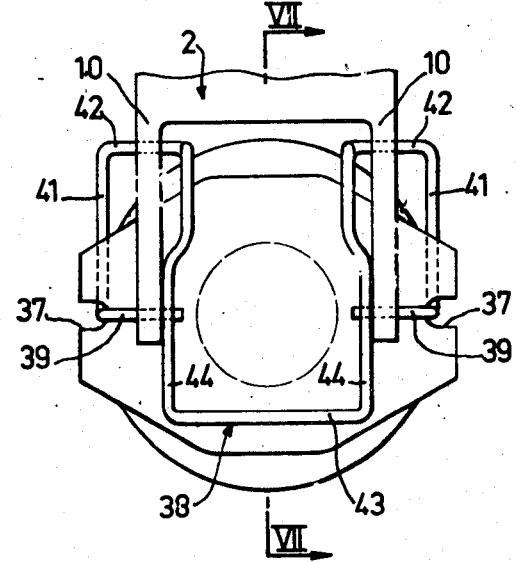
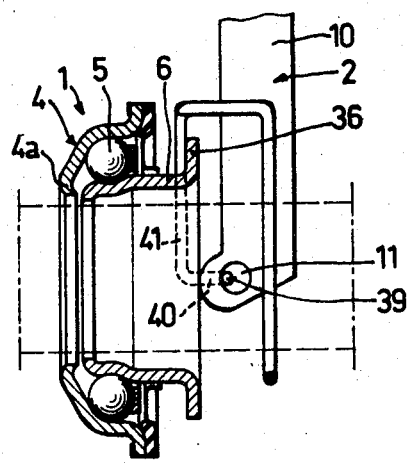

CLUTCH THRUST BEARING DEVICE

BACKGROUND AND SUMMARY

The present invention relates to clutch thrust bearing devices for disc clutches and more particularly for diaphragm clutches. The clutch thrust bearing has a roller bearing which typically includes a rotatable race and a non-rotatable race. In the clutch disengagement action the thrust bearing slides axially on the shaft or a guide tube, and the rotatable bearing race transmits the disengaging stress to the diaphragm.

In a known clutch thrust bearing device, a spring applies pressure to opposite sides of the non-rotatable bearing race and pulls the clutch release fork against the inner race of the thrust bearing to secure the bearing to the release fork. To center the fork, the branches of the fork are located between brackets or similar projections which extend from the inner non-rotatable race of the thrust bearing, the brackets bearing directly on the fork. In this prior structure, the fork is centered in a relatively rigid manner, and each thrust bearing must be designed to coact with a particular size of release fork (see for example French Patent of addition No. 89,929).

An object of the present invention is to provide thrust bearing devices in which the same thrust bearing may be used with clutch release forks having different configurations. It is desired also to provide a clutch thrust bearing device in which the securing spring of the clutch release fork ensures direct elastic centering of the fork relative to the thrust bearing. Still another object is to provide a clutch thrust bearing device in which the spring configuration is such that the thrust bearing is centered relative to the branches of the clutch release fork in a more effective manner than has heretofore been possible.

According to the present invention, the clutch thrust bearing device includes a roller bearing provided with inner and outer races. The inner race has a radial flange. A spring mounted on the radial flange has two fork-contacting portions which bear laterally against the branches of the clutch release fork. The spring alone centers the fork relative to the thrust bearing. The magnitude of fork-centering forces can be modified by changing the configuration of the spring. Furthermore, the invention makes it possible to use one clutch thrust bearing with different clutch release forks having differing dimensions, merely by modifying the spring configuration.

According to a first embodiment of the invention, the fork-contacting portions of the spring contact and bear against the outer faces of the branches of the fork. The spring also bears outwardly on the inner faces of two axial brackets which extend from the radial flange of the inner bearing race.

In another embodiment, the fork-contacting portions of the spring are in direct lateral contact with the inner faces of the branches of the fork.

In the embodiments mentioned above, the spring which ensures direct elastic centering of the fork relative to the thrust bearing acts on the branches of the fork and the faces of axial brackets which extend from the radial flange of the inner race of the roller bearing. In a variant embodiment, the radial flange of the inner race has, in lieu of brackets, diametrically opposed radial recesses which receive the portions of the spring.

In another embodiment the fork-contacting portions of the spring come into direct lateral contact with the inside faces of the branches of the clutch release fork and other portions of the spring loop around to contact the outer faces of axial brackets on the bearing race. In this construction, the spring biases the axial brackets of the radial flange inwardly in opposite directions, toward their respective branches of the clutch release fork.

The invention will be better understood from the following detailed description of some particular embodiments which shall serve to exemplify the invention but not to limit it.

THE DRAWINGS

FIG. 4 is a side view of a third embodiment of a clutch thrust bearing device according to the invention;

FIG. 5 is a sectional view taken along V—V of FIG. 4;

FIG. 6 is a side view of a fourth embodiment of a clutch thrust bearing device according to the invention;

FIG. 7 is a sectional view taken along VII—VII of FIG. 6;

DESCRIPTION OF THE PREFERRED EMBODIMENTS

Figure 1:
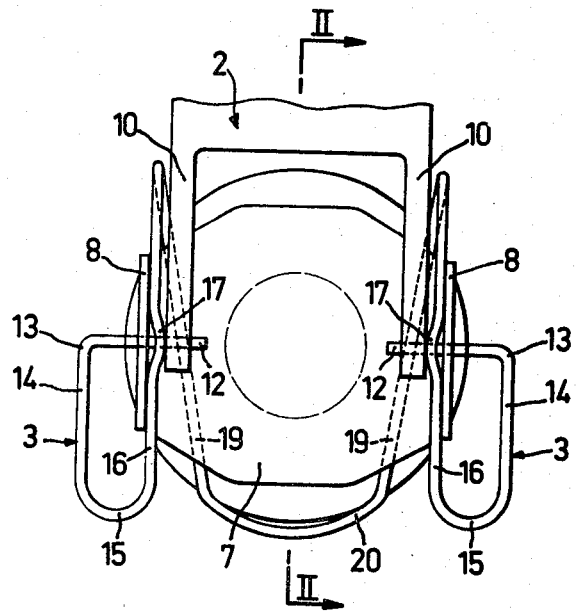
FIG. 1 shows an exterior side view of a first embodiment of a clutch thrust bearing device according to the invention.
Figure 2:
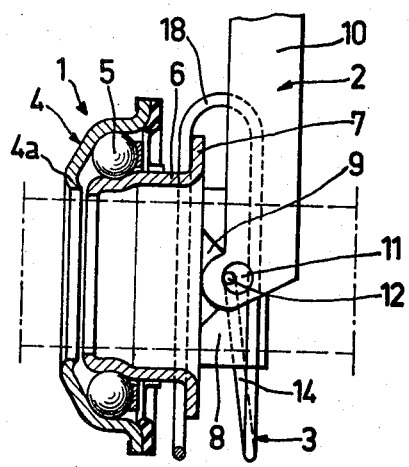
FIG. 2 is a sectional view taken along II—II of FIG. 1.

The clutch thrust bearing assembly of FIGS. 1 and 2 includes a roller bearing 1, a clutch release fork 2 and a securing spring 3.

The roller bearing 1 has an outer race 4 made of thin sheet-metal which is formed or rolled, and provided with an outer toroidal part 4a which comes into frictional contact with the surface of a conventional diaphragm not shown in the Figure. The bearing also has balls 5 located between the outer race 4 and an inner race 6. The inner race has a radial flange 7. Two axial brackets 8 extend from diametrically opposed sides of flange 7, and point towards the exterior relative to the bearing 1. Each bracket 8 has an opening 9.

The clutch release fork 2 has two branches 10 with lateral openings 11 near their ends.

The clutch release fork 2 is secured to the bearing 1 by a spring 3 which works together with the openings 9 and 11 in the brackets 8 and branches 10.

The spring 3 has a symmetrical configuration as do the two branches 10 of the clutch release fork and the brackets 8 of the inner race 6. The spring 3 has two end sections 12 which are inserted radially inwardly through the openings 9 of the brackets 8 and the openings 11 of the branches 10 of the fork 2. The spring 3 is bent at 13 and continues as a rectilinear section 14 which is slightly inclined relative to a radial plane as may be seen in FIG. 2. This rectilinear part 14 is situated outside the corresponding bracket 8 on the inner race 6 and extends below the ends of the branches 10 of the fork 2. The spring 3 is then bent 180° at curved section 15 such that it returns inside the brackets 8. Spring 3 continues as section 16, which is perceptibly rectilinear and comes into contact with the inner surface of the corresponding bracket 8. Rectilinear section 16 has a boss 17 in the vicinity of its median part which is in contact with the bracket 8. Boss 17 comes into direct lateral contact with the outer surface of the branch 10 of clutch release fork 2. As a result, the branch 10 of the fork 2 is spaced from the bracket 8 a distance corresponding to the dimensions of the boss 17.

Spring 3 continues as a curve 18 which returns in the direction of the bearing 1 to a rectilinear section 19 which is slightly inclined relative to the axis of symmetry of the spring. The bend 20 which is a continuation of the rectilinear section 19 joins the two symmetrical halves of the spring 3. The bend 20 and the rectilinear sections 19 are placed on the same side of the radial flange 7 as the bearing 1 as may be seen in FIG. 2.

The spring has a squeezing action between its ends 12 and the rectilinear sections 19, which biases the sections 19 toward each other and ensures that it is retained relative to the bearing 1. The branches 10 of the clutch release fork 2 are connected by ends 12 to the bearing 1, with the clutch release fork being centered directly by the spring. It will be noticed that it is possible, by simple modification of the dimensions of the boss 17, to increase or decrease the distance between the brackets 8 and the branches 10 so that the same clutch thrust bearing may be used for vehicles having clutch release forks with different widths. In any case, the thrust bearing is centered by having the boss 17 resiliently compressed between the branches 10 of the fork and the brackets 8 of the inner race. Moreover, it will be noted that the curved part 15 ensures that a great flexible length of the spring is available to permit substantial elastic movement of the spring section which axially retains the thrust bearing on the clutch release fork 2.

Figure 3:
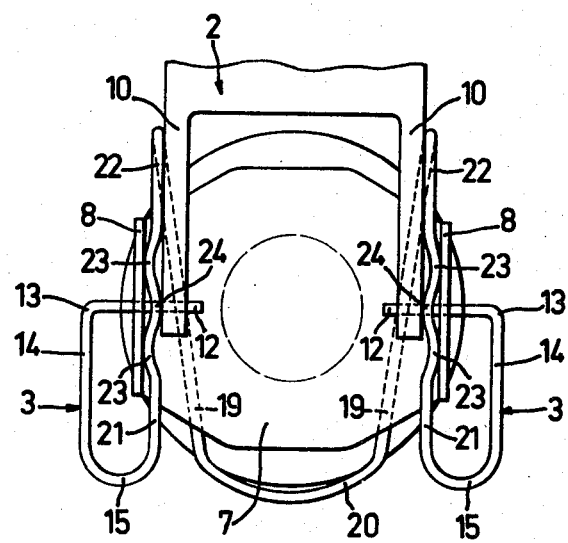
FIG. 3 is a view similar to FIG. 1 illustrating a second embodiment in which the configuration of the spring is modified.

The embodiment of FIG. 3 differs from that of FIGS. 1 and 2 solely in the configuration of the portions of the spring which contact the brackets 8. In this embodiment, bosses 23 and 24 are formed in a rectilinear section which includes portions 21 and 22. Portion 21 extends from the bend 15, and portion 22 extends into the rectilinear part 19. The bosses 23 contact the bracket 8 and the oppositely-directed boss 24 contacts the outer surface of the same branch 10 of the fork. This configuration permits a greater distance between the branches 10 and the brackets 8 than the embodiment of FIGS. 1 and 2.

The embodiment of FIGS. 4 and 5 differs from the preceding ones solely by virtue of the configuration of the spring, the other identical pieces having the same reference numerals. In this variant, the spring 25 has end sections 26 pointing radially and introduced laterally through the openings 9 of brackets 8 and the openings 11 of branches 10 of the fork 2. The spring 25 is continued after a 90° bend 27 by a rectilinear section 28 followed by a curved section 29 which extends toward the bearing 1. Spring 25 continues as a rectilinear section 30 which passes behind the radial flange 7 of the inner race 6. The spring 25 is then curved again, continues as rectilinear section 31 and then curves to return towards the fork 2 as rectilinear part 32 as seen in FIG. 5. The parts 30, 31 and 32 are situated in a common plane which lies parallel to the axis of the thrust bearing. The rectilinear portion 32 is on an opposite side of the inner flange 7 from the bearing 1, and it contacts the inner face of the bracket 8 as seen in FIG. 4. This ensures that the spring 25 is kept in position relative to the thrust bearing. The two symmetrical halves of the spring are joined by a rounded bend 33 which is located outside the radial flange 7, while the branches 34 of this bend are connected with the rectilinear sections 32 by a curved section 35 which ensures suitable spacing between the branches 34 and the rectilinear sections 32. The branches 34 come into direct lateral contact with the inner faces of the branches 10 of the fork 2 which are thus suitably centered relative to the thrust bearing. It will be noted in this embodiment that the rigidity of the centering of the fork relative to the thrust bearing, takes place in a relatively elastic manner through the intermediary of curved parts 35 of the spring 25. As in the preceding embodiments, use of the spring 25 as the sole means of centering the fork relative to the thrust bearing enables the same thrust bearing to be used for vehicles equipped with different forks, solely by modifying the dimensions of the spring 25.

In the embodiment of FIGS. 6 and 7, the elements in common with the prior embodiments have the same reference numerals. In this embodiment, the inner race of the bearing 1 also has a radial flange 36 which instead of axial brackets has two radial recesses 37. These recesses 37 are on diametrically opposite sides of the radial flange 36 as were the axial brackets 8 of the previous embodiments.

The spring 38 has end portions 39 introduced radially into the openings 11 of the branches 10 of the fork 2. Spring 38 continues with a 90° bend and a section 40 which is substantially parallel to the axis of the thrust bearing. This section 40 lies in the radial recesses 37 of the flange 36 such that it is retained laterally and radially on the flange. The spring 38 continues after a 90° bend as a rectilinear section 41 situated on the same side of the flange 36 as the bearing 1. A rectilinear section 42 is then directed at 90° to part 41, towards the axis of the thrust bearing. The symmetrical parts of the spring 38 are then joined by a bend 43 located on an opposite side of the radial flange 36 from the fork. The lateral branches 44 come into direct lateral contact with the inner surfaces of the branches 10 of the fork 2. The thrust bearing is thereby centered relative to the fork in a relatively elastic manner by the squeezing action of spring 38 between the branches 10 and the inner edges of the openings 37.

Figure 8:
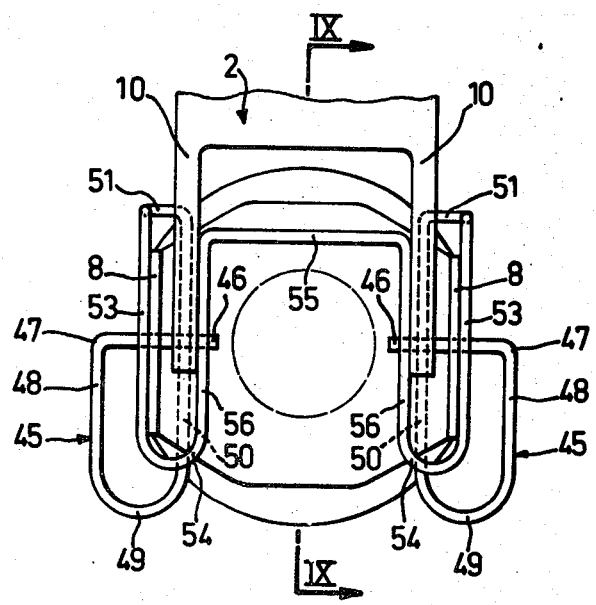
FIG. 8 shows an exterior side view of a fifth embodiment of a clutch thrust bearing device according to the invention; and, FIG. 9 is a section taken along IX—IX of FIG. 8.
Figure 9:
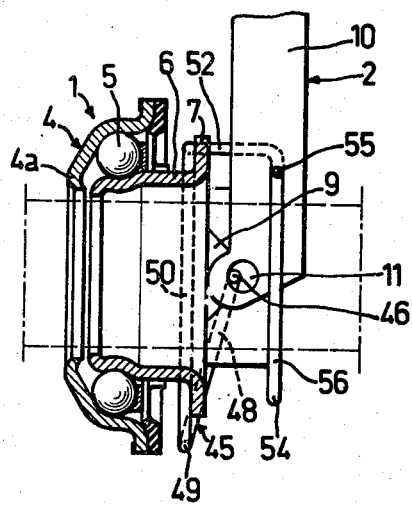

In the embodiment of FIGS. 8 and 9, the clutch release fork 2 is secured relative to the bearing 1 by the spring 45 which has end portions 46 extending through the openings 9 and 11 in the brackets 8 and branches 10.

The spring 45 has a symmetrical configuration as do the two branches 10 of the clutch release fork and the brackets 8 of the inner race 6. The spring 45 is then bent 90° at 47 and extends into rectilinear section 48 which is slightly inclined relative to a radial plane as may be seen in FIG. 9. This rectilinear section 48 is situated on an opposite side of bracket 8 from the roller bearing and extends below the ends of the branches 10 of the fork 2. The spring 45 is then bent 180° at 49 such that it passes in the direction of the radial flange 7 and is located on an opposite side of flange 7 from the fork. It can be seen in the drawings that the rectilinear section 50 of each side of the spring 45 passes towards the interior of each of said flanges 7 of the inner race 6. Spring 45 continues after a 90° bend as an exteriorly-extending first radial section 51 connected by another 90° bend to an exteriorly-extending axial section 52. This enables the following rectilinear section 53 of the spring 45 to bear on the outer face of the axial bracket 8 as may be seen more particularly in FIG. 8. Section 54 provides a 180° bend. The symmetrical halves of the spring 45 are then joined by the bend 55 which is located where the lateral branches 56 of bend 55 come into direct lateral contact with the inner surfaces of the branches 10 of the fork 2.

As shown in FIG. 9, each side of spring 45 has its first 180° loop formed of parts 48, 49 and 50, disposed in two planes which are slightly inclined relative to one another. Spring 45 also has a second 180° loop formed by the sections 53, 54 and 56. This second loop biases the inner faces of branches 10 of the fork 2 toward the corresponding outer faces of the axial brackets 8, thus ensuring elastic squeezing and automatic centering of the thrust bearing relative to the clutch release fork 2.

The clutch thrust bearing device according to the present invention has the advantage of allowing elastic centering of the clutch release fork relative to the thrust bearing, irrespective of the dimensions of the clutch release fork, simply by modifying the configuration of the spring. Moreover, the elasticity of the spring may be used to obtain the desired rigidity for centering the fork relative to the thrust bearing.

Persons familiar with this art will realize that the invention may take other forms than the preferred illustrated embodiments. Accordingly, it is emphasized that the invention is not limited solely to the disclosed embodiments but is embracing of modifications thereto and variations thereof which fall within the spirit of the following claims.

I claim:

1. A clutch thrust bearing device comprising a rolling bearing provided with inner and outer races, said inner race having a radial flange, a clutch release fork having two branches connected to said rolling bearing for moving said rolling bearing axially, said fork and said bearing being capable of lateral movement relative to each other, and a unitary spring engaged with said inner race, said spring having two fork-contacting portions bearing laterally against said branches to move said fork elastically to a position which is centered relative to said rolling bearing.

2. A clutch thrust bearing device according to claim 1, having means on said radial flange of said inner race for positioning said spring laterally.

3. A clutch thrust bearing device according to claim 1, having two axial brackets on said radial flange of said inner race, said fork-contacting portions of said spring lying between one of said branches and one of said brackets in lateral contact with said brackets and branches.

4. A clutch thrust bearing device according to claim 3 wherein each of said fork-contacting portions comprises a rectilinear section provided with a boss in contact with one of said branches of said fork.

5. A clutch thrust bearing device according to claim 3, wherein each of said fork-contacting portions comprises a rectilinear section and a boss in contact with one of said branches of said fork, and a boss in contact with one of said brackets.

6. A clutch thrust bearing device according to claim 1 wherein said spring has two symmetrical halves, two axial brackets located on said flange, said branches and said brackets having laterally aligned openings therein, said spring having opposite end sections each of which projects laterally through a said opening in a bracket and a said opening in a branch, each of said end sections extending from a curved section which extends from a rectilinear section which extends from another curved section which extends from said fork-contacting portion, said fork contacting portion being rectilinear and provided with a boss, and a bend connecting said two symmetrical halves of said spring, said bend and said branches being located on opposite sides of said radial flange.

7. A clutch thrust bearing device according to claim 1, wherein said branches of said fork have inside faces, said fork-contacting portions of said spring being in direct lateral contact with said inside faces.

8. A clutch thrust bearing device according to claim 7, having two axial brackets on said radial flange, each of said axial brackets having an inner face, said spring including sections which contact said inner faces of said axial brackets.

9. A clutch thrust bearing device according to claim 8, wherein said spring has two symmetrical halves each of which has an end section, said axial brackets on said flange having openings therein, said branches on the fork having openings therein, each of said end sections of the spring projecting laterally through one of said openings in said brackets and one of said openings in said branches, each of said end sections of said spring extending from an inside section which lies on an opposite side of said radial flange from said fork, said inside section extending from said fork-contacting portion, said spring including a central bend which connects said symmetrical halves, said central bend being located on an opposite side of said radial flange from said inside section.

10. A clutch thrust bearing device according to claim 1 wherein said radial flange has openings therein and said branches of the fork have openings therein, said spring being formed of two symmetrical halves each of which has an end section which projects laterally through an opening in one of said branches, said end portion extending from an axial section of the spring which passes through a said opening in the radial flange to a location on the opposite side of said radial flange from said fork, said axial section extending from said fork-contacting portions of the spring, said spring including a bend which joins said symmetrical halves.

11. A clutch thrust bearing device according to claim 1 wherein said spring has two symmetrical halves each of which has an end section, axial brackets located on said radial flange, said axial brackets being provided with openings and outer faces, said branches being provided with openings and inner faces, said end sections projecting laterally through said openings in said brackets and said branches, each of said end sections of said spring extending from a bracket-contacting section which lies in direct lateral contact with said outer face of said axial bracket, said bracket-contacting section extending from said fork-contacting portion, said spring including a bend which joins said symmetrical halves.

12. A clutch thrust bearing device according to claim 11 wherein said end sections are connected to the bracket-contacting sections by a section of the spring which lies on an opposite side of said radial flange from said fork, said bend lying on the same side of said flange as said fork.

* * * * *

UNITED STATES PATENT AND TRADEMARK OFFICE
CERTIFICATE OF CORRECTION

PATENT NO. : 4,271,949
DATED : June 9, 1981
INVENTOR(S) : JEAN PIERRE GUERTON ET AL It is certified that error appears in the above—identified patent and that said Letters Patent is hereby corrected as shown below:

On the title page, change the spelling of the assignee's name (item 73) to the following:

S.K.F. COMPAGNIE D'APPLICATIONS MECHANIQUES

Signed and Sealed this

Eleventh Day of August 1981

[SEAL]

*Attest:*

GERALD J. MOSSINGHOFF

*Attesting Officer* — *Commissioner of Patents and Trademarks*